United States Patent
Wang et al.

(10) Patent No.: US 10,160,818 B2
(45) Date of Patent: Dec. 25, 2018

(54) POLYOLEFINS

(71) Applicant: NOVA Chemicals (International) S.A., Fribourg (CH)

(72) Inventors: Qinyan Wang, Calgary (CA); Tyler Craig, Vancouver (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/521,705

(22) PCT Filed: Nov. 10, 2015

(86) PCT No.: PCT/IB2015/058679
§ 371 (c)(1),
(2) Date: Apr. 25, 2017

(87) PCT Pub. No.: WO2016/079636
PCT Pub. Date: May 26, 2016

(65) Prior Publication Data
US 2017/0260307 A1    Sep. 14, 2017

(30) Foreign Application Priority Data

Nov. 17, 2014    (CA) .................................... 2871404

(51) Int. Cl.
| | | |
|---|---|---|
| C08F 210/16 | (2006.01) | |
| C08F 4/642 | (2006.01) | |
| C08F 2/14 | (2006.01) | |
| C08F 4/76 | (2006.01) | |
| C08F 2/34 | (2006.01) | |
| C08F 4/659 | (2006.01) | |

(52) U.S. Cl.
CPC .............. *C08F 210/16* (2013.01); *C08F 2/14* (2013.01); *C08F 2/34* (2013.01); *C08F 4/6428* (2013.01); *C08F 4/65912* (2013.01); *C08F 4/65916* (2013.01); *C08F 4/76* (2013.01); *C08F 2410/00* (2013.01); *C08F 2420/03* (2013.01); *C08F 2420/04* (2013.01); *C08F 2500/05* (2013.01)

(58) Field of Classification Search
None
See application file for complete search history.

(56) References Cited

U.S. PATENT DOCUMENTS

| | | | |
|---|---|---|---|
| 4,923,833 A | 5/1990 | Kioka et al. | |
| 6,528,671 B1 | 3/2003 | Nabika | |
| 6,984,695 B2 | 1/2006 | Brown et al. | |
| 7,341,971 B2 | 3/2008 | Denifl et al. | |
| 2003/0109730 A1* | 6/2003 | Nabika ...................... | C07F 7/00 556/9 |
| 2005/0054518 A1* | 3/2005 | Denifl ...................... | C08F 10/00 502/103 |

(Continued)

FOREIGN PATENT DOCUMENTS

WO        03/051934 A2    6/2003

*Primary Examiner* — Richard A Huhn
(74) *Attorney, Agent, or Firm* — Julie L. Heinrich

(57) ABSTRACT

The present invention provides a polyolefin polymer having a bimodal composition with a reduced higher molecular weight component prepared using a self-supported phosphinimine single site catalyst. The catalyst is prepared by precipitating an emulsion of the activated catalyst from a perfluoroalkane continuous phase resulting in spherical catalyst particles having a diameter typically from 5 to 200 µm.

29 Claims, 5 Drawing Sheets

(56) References Cited

U.S. PATENT DOCUMENTS

2006/0235146 A1* 10/2006 Goyal .................. C08F 210/16
                                                               525/53
2012/0316301 A1* 12/2012 Minh Hoang ........ C08F 210/16
                                                               526/126

* cited by examiner

POLYOLEFINS

TECHNICAL FIELD

The present invention relates to olefin polymers, preferably polyethylene prepared in a gas phase or slurry phase polymerization in the presence of a transition metal catalyst comprising a phosphinimine ligand. The polyethylene has a CBDI greater than 65%, and bimodal TREF curve. The polyethylene is prepared in the presence of a self supported catalyst.

BACKGROUND ART

Prior to the commercial introduction of metallocene type catalysts, the heterogeneity of catalysts such as chrome based catalyst and the Ziegler Natta catalyst contributed far more to the heterogeneity of the resulting polymer than the effects of the support. With the introduction of metallocene type catalysts (single site catalysts), the heterogeneity of the support may significantly contribute to the heterogeneity of the resulting polymer. Depending on the catalyst, this may lead to an undesirable amount of a higher molecular weight fraction (e.g. a significant second peak at the right hand side (high elution temperature) of a TREF curve).

U.S. Pat. No. 4,923,833 issued May 8, 1990 to Kioka et al., assigned to Mitsui Petrochemical Industries, Ltd. teaches a number of methods to prepare a metallocene catalyst in the presence of an activator without a support such as silica. The second method described from line 62 of column 9 through line 45 of column 10 teaches forming a solution of MAO and a metallocene and adding to it a non-solvent for the MAO to precipitate the MAO and metallocene. The patent does not disclose catalysts containing a phosphinimine ligand nor does it disclosure the use of fluorinated hydrocarbons as a non solvent for the MAO and the catalyst.

There are a number of related patents in the name of Denifl et al, assigned to Borealis Technology Oy that disclose a method to prepare a catalyst without an external support (self supported catalyst). These patents are related to or derived from PCT/EPO02/14461 (such as U.S. Pat. No. 7,341,971 issued Mar. 11, 2008). The thrust of the disclosure is to metallocene type catalysts and there does not appear to be any disclosure of a catalyst containing a phosphinimine ligand. The reference teaches that an organic solution of catalyst and activator together with a surfactant are added to a liquid under conditions at which the liquid is a non solvent for the solution of activator and catalyst (i.e. an emulsion is formed). The resulting emulsion may then be subjected to conditions which cause the organic solvent to become miscible in the liquid. This phase change causes the catalyst particles formerly dispersed in the organic solvent to be precipitated from the liquid. The particles may then be recovered. In a preferred embodiment of the patents the catalyst is prepolymerized prior to use in a commercial reactor.

The Borealis patents suggest the support can also have an adverse effect on the activity of the catalyst, on its polymerization behavior and on the properties of the end polymer (e.g. U.S. Pat. No. 7,341,971 Col. 1 lines.58-62). The disclosures of the Borealis patents focus more on the morphology of the polymer particles and very little is disclosed about the architecture of the resulting polymer.

Phosphinimine containing catalysts are also known in the patent literature. There are a number of patents in the names of Stephan and Brown among others assigned to NOVA Chemicals Corporation and NOVA Chemicals International S.A. relating to the use of transition metal complexes containing a cyclopentadienyl type ligand and a phosphinimine ligand for use as a catalyst in the polymerization of alpha olefins. In solution phase polymerization where such a catalyst is not supported the resulting polymer is bimodal having a component which is characterized in U.S. Pat. No. 6,984,695 as having a higher molecular weight and a high density. Most preferably this fraction is present in an amount from 2 to 10 weight % of the polymer.

When some phosphinimine containing catalysts, as described below, are used in supported form for example in a gas phase or slurry phase polymerization the high molecular weight/high density fraction may become excessive. Surprisingly, Applicant has found that by treating such catalyst in accordance with the process described in the Borealis patents the amount of the high molecular weight/high density fraction in the resulting polymer is significantly reduced.

The present invention seeks to provide a copolymer comprising from 80 to 99 weight % of ethylene and from 20 to 1 weight % of one or $C_{4-8}$ alpha olefins, said copolymer having a density from 0.910 to 0.945 g/cc; a CDBI greater than 65% as measured using TREF; a polydispersity from 2.5 to 3.5, and a bimodal TREF curve, prepared by a gas phase or slurry polymerization in the presence of a self supported catalyst prepared in the presence of a catalyst containing a phosphinimine ligand and an activator, which catalyst is used without an external support, such as silica or alumina.

DISCLOSURE OF THE INVENTION

The present invention provides a copolymer comprising from 80 to 99 weight % of ethylene and from 20 to 1 weight % of one or $C_{4-8}$ alpha olefins, said copolymer having a density from 0.910 to 0.945 g/cc; a CDBI greater than 65% as measured using TREF; a polydispersity from 2.5 to 3.5, and a bimodal TREF curve, prepared by a gas phase or slurry polymerization in the presence of a self supported catalyst prepared by:

forming a hydrocarbyl solution of a catalyst of the formula

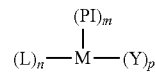

wherein M is selected from the group consisting of Ti, Zr and Hf; Pl is a phosphinimine ligand of the formula:

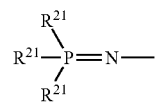

wherein each $R^{21}$ is independently selected from the group consisting of a hydrogen atom; a halogen atom; $C_{1-10}$ hydrocarbyl radicals L is a monoanionic ligand selected from the group consisting of a cyclopentadienyl-type ligand which is substituted by up to three $C_{1-6}$ linear, branched, cyclic or aromatic hydrocarbons which are unsubstituted or up to fully substituted by fluorine atoms;

Y is independently selected from the group consisting of activatable ligands; m is 1 or 2; n is 0 or 1; p is an integer and the sum of m+n+p equals the valence state of M and an activator of the formula:

$R^{12}{}_2AlO(R^{12}AlO)_qAlR^{12}{}_2$ wherein each $R^{12}$ is independently selected from the group consisting of $C_{1-10}$ hydrocarbyl radicals and q is from 3 to 50 to provide a molar ratio of Al from the activator to M from the catalyst from 10:1 to 500:1; in the presence of a surfactant selected from the group consisting of $C_{3-10}$ fluorocarbyl epoxides or alcohols which solution is dispersed in a $C_{6-12}$ perfluoroalkane diluent wherein the surfactant is present in the solution in an amount from 0.04 to 0.14 moles per unit volume of solvent at a volume ratio of solvent to perfluoroalkane of 0.2, without additional surfactant with stirring at a temperature from −15° C. to room temperature to form a stable emulsion and adding a part or all of said emulsion to additional $C_{6-12}$ perfluoroalkane at a temperature greater than 70° C. to precipitate the catalyst as particles having a diameter from 5 to 200 μm.

In a further embodiment the catalyst particles are recovered by one or more of decanting the perfluoroalkane and hydrocarbly solvent and removing the perfluoroalkane and hydrocarbly solvent under a stream of inert gas.

In a further embodiment the surfactant is used in an amount from 0.07 to 0.11 moles of surfactant per unit volume of solvent at a volume ratio of solvent to perfluoroalkane of 0.2.

In a further embodiment the surfactant is formed by reacting a surfactant precursor selected from the group consisting of one or more $C_{4-10}$ perfluorocarbons having a terminal hydroxyl group or a terminal oxirane (epoxide) group with said activator at a molar ratio of activator to fluorocarbon from 4 to 150.

In a further embodiment the surfactant precursor is selected from the group consisting of perfluorohexanol, perfluoroheptanol, perfluoroctanol and perfluorononanol.

In a further embodiment the $C_{6-12}$ perfluoroalkane is perfluorooctane.

In the catalyst the leaving group is selected from the group consisting of chlorine atoms and $C_{1-4}$ alkyl radicals.

In a further embodiment in the phosphinimine ligand $R^{21}$ is selected from the group consisting of $C_{3-6}$ straight chained or branched alkyl radicals.

In a further embodiment in the catalyst L is selected from the group consisting of a cyclopentadienyl radical which is substituted at the one position with a pentafluorophenyl radical and at the 2 position with an isopropyl radical.

In a further embodiment in the catalyst the molar ratio of Al:M is from 50:1 to 150:1.

In a further embodiment in the catalyst M is Ti.

In a further embodiment the solvent and diluents are removed from the catalyst at a temperature not less than 90° C.

In a further embodiment the polymer has a density for 0.910 to 0.920 comprising from 85 to 95 weight % of ethylene and from 15 to 5 weight % of a monomer selected from the group consisting of 1-butene and 1-hexene.

In a further embodiment the polymer is prepared in a gas phase polymerization.

In a further embodiment the polymer is prepared in a slurry phase polymerization.

In a further embodiment the catalyst is prepolymerized with one or more $C_{2-6}$ alpha olefins to provide a weight growth increase from 1 to 25, typically 1:18 preferably 1:10 desirable 1:1.5.

In a further embodiment the polymer has an increased bulk density from 10-25 weight % over the same the same catalyst using the same process in the presence of the same catalyst which is supported on an inorganic oxide, such as $SiO_2$.

In a further embodiment the catalyst particles are recovered by one or more of decanting the perfluoroalkane and hydrocarbly solvent and removing the perfluoroalkane and hydrocarbly solvent under a stream of inert gas.

In a further embodiment the surfactant is used 0.07 to 0.11 moles of surfactant per unit volume of solvent at a volume ratio of solvent to perfluoroalkane of 0.2.

In a further embodiment the surfactant is formed by reacting a surfactant precursor selected from the group consisting of one or more $C_{4-10}$ perfluorocarbons having a terminal hydroxyl group or a terminal oxirane group with said activator at a molar ratio of activator to fluorocarbon from 4 to 150.

In a further embodiment the surfactant precursor is selected from the group consisting of perfluorohexanol, perfluoroheptanol, perfluoroctanol and perfluorononanol.

In a further embodiment the $C_{6-12}$ perfluoroalkane is perfluorooctane.

In a further embodiment in the catalyst the leaving group is selected from the group consisting of chlorine atoms and $C_{1-4}$ alkyl radicals.

In a further embodiment in the phosphinimine ligand $R^{21}$ is selected from the group consisting of $C_{3-6}$ straight chained or branched alkyl radicals.

In a further embodiment in the catalyst L is selected from the group consisting of a cyclopentadienyl radical which is substituted at the one position with a pentafluorophenyl radical and at the 2 position with an isopropyl radical.

In a further embodiment in the catalyst the molar ratio of Al:M is from 50:1 to 150:1

In a further embodiment in the catalyst M is Ti.

In a further embodiment the solvent and diluents are removed from the catalyst at a temperature not less than 90° C.

In a further embodiment the polymer has a density for 0.910 to 0.920 comprising from 85 to 95 weight % of ethylene and from 15 to 5 weight % of a monomer selected from the group consisting of 1-butene and 1-hexene.

In a further embodiment the polymer is prepared in a gas phase polymerization.

In a further embodiment the polymer is prepared in a slurry phase polymerization.

In a further embodiment there is provided a spherical self supported phosphinimine catalyst having a diameter from 5 to 200 μm, comprising a catalyst of the formula

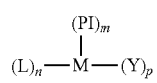

wherein M is selected from the group consisting of Ti, Zr and Hf; Pl is a phosphinimine ligand of the formula:

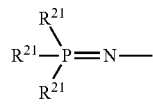

wherein each $R^{21}$ is independently selected from the group consisting of a hydrogen atom; a halogen atom; $C_{1-10}$ hydrocarbyl radicals L is a monoanionic ligand selected from the group consisting of a cyclopentadienyl-type ligand which is substituted by up to three $C_{1-6}$ linear, branched, cyclic or aromatic hydrocarbons which are unsubstituted or up to fully substituted by fluorine atoms;

Y is independently selected from the group consisting of activatable ligands; m is 1 or 2; n is 0 or 1; p is an integer and the sum of m+n+p equals the valence state of M supported on an activator of the formula:

$$R^{12}{}_2AlO(R^{12}AlO)_qAlR^{12}{}_2$$

wherein each $R^{12}$ is independently selected from the group consisting of $C_{1-20}$ hydrocarbyl radicals and q is from 3 to 50 to provide a molar ratio of Al from the activator to M from the catalyst from 10:1 to 500:1.

In a further embodiment the catalyst is prepared by forming a solution of said catalyst and said activator in a hydrocarbyl solvent in the presence of a surfactant selected from the group consisting of $C_{3-10}$ fluorocarbyl epoxides or alcohols and subsequently dispersing said solution in a $C_{6-12}$ perfluoroalkane diluent without additional surfactant with stirring at a temperature from −15° C. to room temperature to form a stable emulsion and adding a part or all of said emulsion to additional $C_{6-12}$ perfluoroalkane at a temperature greater than 70° C. to precipitate the catalyst as particles wherein the surfactant is present in the solution in an amount from 0.04 to 0.14 moles per unit volume of solvent at a volume ratio of solvent to perfluoroalkane of 0.2

BEST MODE FOR CARRYING OUT THE INVENTION

Figure 1:
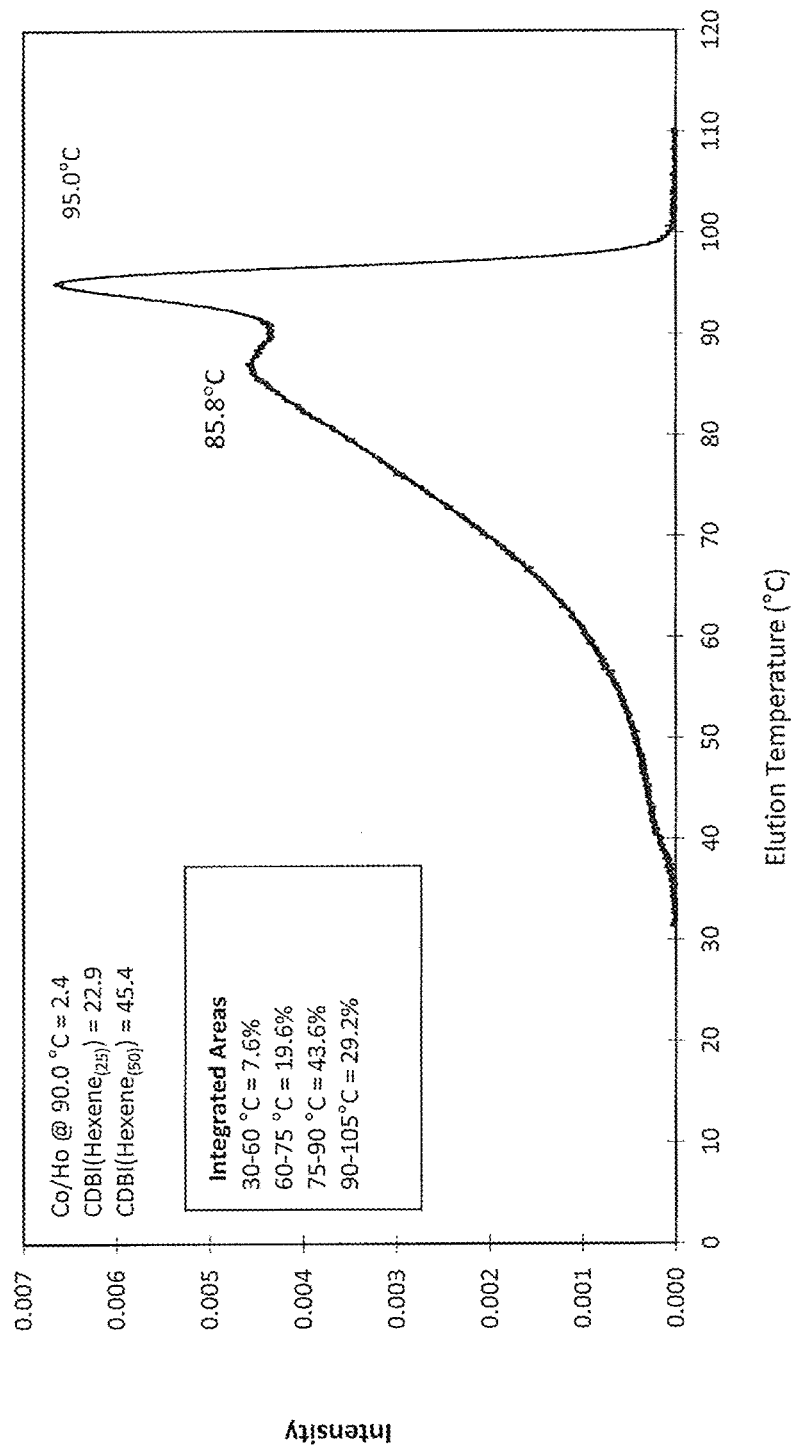
FIG. 1 is a CTREF profile of a polymer prepared in a bench scale reactor (e.g. not solution phase) using a phosphinimine of the present invention activated with methyl aluminumoxane supported on a silica (Sylopol 2408).

The polymers of the present invention are made in the presence of a catalyst comprising a single site type catalyst activated with a aluminum compound.

The Catalyst

The single site type catalyst comprises a complex of a metal selected from Ti, Zr, and Hf, complexed with a cyclopentadienyl type ligand, a phosphinimine ligand and leaving groups.

Typically the single site catalyst has the formula $$(L)_n\text{—}M\text{—}(Y)_p$$
$$|$$
$$(PI)_m$$

wherein M is selected from the group consisting of Ti, Zr and Hf; Pl is a phosphinimine ligand of the formula:

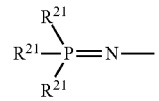

wherein each $R^{21}$ is independently selected from the group consisting of a hydrogen atom; a halogen atom; $C_{1-10}$ hydrocarbyl radicals L is a monoanionic ligand selected from the group consisting of a cyclopentadienyl-type ligand which is substituted by up to three $C_{1-6}$ linear, branched, cyclic or aromatic hydrocarbons which are unsubstituted or up to fully substituted by fluorine atoms;

Y is independently selected from the group consisting of activatable ligands; m is 1 or 2; n is 0 or 1; p is an integer and the sum of m+n+p equals the valence state of M.

In the catalyst preferably M is Ti.

In the phosphinimine ligand $R^{21}$ is preferably selected from the group consisting of $C_{3-6}$ straight chained or branched alkyl radicals. Preferably in the phosphinimine ligand the $R^{21}$ substituents are within 1 or 2, preferably 1, carbon atom(s) of each other, most preferably the same. Preferably the $R^{21}$ substitutents are branched alkyl radicals, most preferably isobutyl radicals.

Preferably the cyclopentadienyl ligand is a cyclopentadienyl ligand which is substituted by one $C_{2-6}$ linear or branched, alkyl radicals and by a $C_6$ aromatic hydrocarbon which is at least three quarters, preferably fully substituted by fluorine atoms. Most preferably the cyclopentadienyl ligand is substituted with a pentafluorophenyl radical and an isopropyl radical which are on adjacent carbon atoms preferably 1 and 2 positions.

In the catalyst preferably Y is selected from the group consisting of a chlorine atom and a $C_{1-4}$ alkyl radical, preferably a methyl radical.

The catalyst is activated with an aluminum compound of the formula $$R^{12}{}_2AlO(R^{12}AlO)_qAlR^{12}{}_2$$

wherein each $R^{12}$ is independently selected from the group consisting of $C_{1-20}$ hydrocarbyl radicals and q is from 3 to 50 to provide a molar ratio of Al from the activator to M from the catalyst from 10:1 to 500:1; Preferably each $R^{12}$ is the same and selected from a $C_{1-4}$ alkyl radical. Most preferably $R^{12}$ is a methyl radical (i.e. the aluminum compound is methyl aluminoxane cyclic or straight). Preferably the molar ratio of Al from the activator to M from the catalyst is from 15:1 to 150:1, preferably from 30:1 to 130:1.

The Solvent.

The solvent for the catalyst is one or more hydrocarbyl compounds. The solvent may be an aromatic solvent such as benzene, toluene or xylene or one or more $C_{4-12}$ paraffin(s) or isoparaffins such as those sold under the trademark ISOPAR by Exxon. Preferably the solvent is an aromatic solvent, most preferably toluene. Both catalysts components, the catalyst and the activator must be soluble in the solvent.

The Surfactant

The surfactant is prepared in situ in the solvent by adding to the solvent surfactant precursor selected from the group consisting of one or more $C_{4-10}$ perfluorocarbons having a terminal hydroxyl group or a terminal oxirane (epoxide)

group and additional activator until there is no more evolution of gas. Typically the molar ratio of precursor to activator is from 4:1 to 150:1, preferably from 10:1 to 35:1.

The activator is the generic aluminum compound (complex) noted above. It may be the same or different from the activator use to activate the catalyst, preferably the same. Some precursors for the surfactant may be selected from the group consisting of perfluorohexanol, perfluoroheptanol, perfluoroctanol and perfluorononanol. Typically the precursor and the activator are reacted in an amount to provide from 0.04 to 0.14, preferably 0.07 to 0.11, moles per unit volume of solvent at a volume ratio of solvent to perfluoroalkane of 0.2. Assuming the droplets are essentially the same size if the volume ratio of solvent to perfluoroalkane is different from 0.2 one would adjust the surfactant amount accordingly. (e.g if the volume ratio is bigger say 0.4 then one would multiply the moles by 0.4/0.2 and if the volume ratio is less (0.1) the one would multiple the moles by 0.1/0.2)

The Diluent

In accordance with the present invention, the solvent for the solution of catalyst is insoluble in, or immiscible with, the diluent at the conditions under which the solution and diluents are originally mixed. However, the solvent and diluents are selected so that under different conditions, typically increased temperature, the solvent becomes at least miscible in the diluent. At conditions where the solvent becomes soluble in, or miscible with the diluent, the diluent is no longer a solvent for the catalyst and activator. Further both the solvent and the diluent should not to any significant extent alter the activity of the catalyst and activator.

As noted above preferred solvents for the catalyst and activator are hydrocarbons, preferably aromatic hydrocarbons, typically $C_6$ aromatic compounds which are unsubstituted or substituted with a $C_{1-4}$ alkyl radical, preferably selected from the group consisting of benzene, toluene and xylene, most preferably toluene.

Given the above list of criteria for the combination of solvent and diluent and the types of preferred solvents there are rather a small number of diluents suitable for use in the present invention. Solvents for forming the continuous phase include fluorinated organic solvents, preferably perfluorinated organic solvents. Examples of the above-mentioned solvents are perfluorinated (a) hydrocarbons, such as alkanes, alkenes and cycloalkanes, Preferred are perfluorohydrocarbons of e.g. $C_6$-$C_{12}$, such as $C_4$-$C_{10}$. Specific examples of suitable perfluoroalkanes and -cycloalkanes include perfluorohexane, perfluoroheptane, perfluorooctane and perfluoro(methylcyclohexane), preferably perfluorooctane.

Dispersion

Typically the solution of catalyst, activator and surfactant is prepared at a low temperature, preferably from −15° C. to room temperature, typically from −15° C. to 15° C., preferably from −8° C. to 15° C., typically from −5° C. to 10° C. The solution is then slowly added to warm diluent at a temperature from about 70° C. to 90° C. with stirring). The cool solution is dispersed in the diluent under stirring at a temperature from 0° C. to 15° C. and an emulsion forms. The emulsion is discharged into additional diluent typically at a temperature from 70° C. to 90° C. with stirring. The catalyst initially being in the dispersed phase and after recovery has a spherical particle diameter typically from 5 to 200 µm, preferably from 10 to 50 µm, Precipitation As the dispersed phase of the emulsion formed above is discharged with stirring into a receiving vessel that contains hot diluent, the solvent becomes miscible in the diluent and the "micells" of catalyst and activator precipitate out of the dispersion. The precipitated catalyst and activator may be separated from the diluent and solvent by conventional means such filtration or decanting followed by drying under an inert atmosphere (e.g. such as passing dry nitrogen through the precipitate).

Prepolymerization

In some instances it may desirable to pre-polymerize the precipitate (catalyst and activator). These types of polymerizations are well known to those skilled in the art. The prepolymerization may be carried out continuously or batch wise in a small reactor. The reaction may be gas phase potentially in a stirred bed reactor or may be in a diluent in which the activator is insoluble such as those noted above or one or more $C_{6-12}$ alkanes such as hexane, cyclohexane, decane, dodecane, and kerosene. Typically a small reactor is scavenged and prepared for use under an inert atmosphere. Catalyst is injected into the reactor and one or more monomers, typically ethylene and optionally a $C_{3-8}$ comonomer are fed under pressure to the reactor. Typically the monomers are added in an amount to provide a weight growth increase from 1 to 25, preferably typically 1:18 preferably 1:10 desirable 1:2 over the starting weight of catalyst. The prepolymerized catalyst is recovered and may be fed to a commercial reactor for polymerization. One of the advantages of prepolymerization is that the resulting polymer (particles before extrusion and formation of pellets) has an increased bulk density from 10-25 weight % over a polymer prepared using the same process in the presence of the same catalyst which is supported on an inorganic oxide.

Polymerization

Gas Phase Polymerization

Fluidized bed gas phase reactors to make polyethylene are generally operated at low temperatures from about 50° C. up to about 120° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Gas phase polymerization of olefins is well known. Typically, in the gas phase polymerization of olefins (such as ethylene) a gaseous feed stream comprising of at least about 80 weight % ethylene and the balance one or more $C_{3-6}$ copolymerizable monomers typically, 1-butene, or 1-hexene or both, together with a ballast gas such as nitrogen, optionally a small amount of $C_{1-2}$ alkanes (i.e. methane and ethane) and further optionally a molecular weight control agent (typically hydrogen) is fed to a reactor and in some cases a condensable hydrocarbon (e.g. a $C_{4-6}$ alkane such as pentane). Typically, the feed stream passes through a distributor plate at the bottom of the reactor and vertically traverses a bed of polymer particles with active catalyst, typically a fluidized bed but the present invention also contemplates a stirred bed reactor. A small proportion of the olefin monomers in the feed stream react with the catalyst. The unreacted monomer and the other non-polymerizable components in the feed stream exit the bed and typically enter a disengagement zone where the velocity of the feed stream is reduced so that entrained polymer falls back into the fluidized bed. Typically, the gaseous stream leaving the top of the reactor is then passed through a compressor. The compressed gas is then cooled by passage through a heat exchanger to remove the heat of reaction. The heat exchanger may be operated at temperatures below about 65° C., preferably at temperatures from 20° C. to 50° C. If there is a condensable gas it is usually condensed and entrained in the recycle stream to remove heat of reaction by vaporization as it recycles through the fluidized bed.

Polymer is removed from the reactor through a series of vessels in which monomer is separated from the off gases. The polymer is recovered and further processed. The off gases are fed to a monomer recovery unit. The monomer recovery unit may be selected from those known in the art including a distillation tower (i.e. a $C_2$ splitter), a pressure swing adsorption unit and a membrane separation device. Ethylene and hydrogen gas recovered from the monomer recovery unit are fed back to the reactor. Finally, make up feed stream is added to the reactor below the distributor plate.

Slurry Polymerization

Slurry processes are conducted in the presence of a hydrocarbon diluent such as an alkane (including isoalkanes), an aromatic or a cycloalkane. The diluent may also be the alpha olefin comonomer used in copolymerizations. Preferred alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 130° C., most preferably less than about 110° C. typically from about 10° C. to 80° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 KPa) when isobutane is used as diluent (see, for example, U.S. Pat. No. 4,325,849) to approximately twice that (i.e. from 30 to 90 atmospheres-about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase.

The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

The slurry reaction may also be conducted in a continuous stirred tank reactor.

The Polymer

The polymer resulting polymer may comprise from 80 to 99 typically from about 90 to 98 weight % of ethylene and from 20 to 1, typically from 10 to 2 weight % of one or $C_{4-8}$ alpha olefins. The polymer may have a density from 0.90 to 0.955, preferably from 0.910 to 0.945 g/cc. The polymer coming out of the reactor (i.e. ex reactor—before going through a pelletizer) should have a bulk density greater than about 20 lbs/ft$^3$, desirably greater than 23 lbs/ft$^3$, preferably greater than 25 lbs/ft$^3$. (320 kg/m$^3$, 368 kg/m$^3$, and 400 kg/m$^3$, respectively)

The polymer architecture is characterized by:
a polydispersity (Mw/Mn) from 2.5 to about 4, preferably from 2.5 to 3.5; a CDBI (composition distribution branching index) as measured using temperature rising elution fractionation (TREF) of greater than 65%, typically from 65% to 75%. (i.e. at least 65 wt % or more of the polymer molecules have a copolymer content within 50 percent of the median total molar comonomer content). The branching distribution as measured using gel permeation chromatography with a fourier transform infrared detector (GPC-FTIR) is typically flat or slightly reversed, that is there may be a comparable or a slightly higher branching content in the higher molecular weight components of the polymer. The TREF curve is bimodal with a shoulder or minor peak (⅔ or less than the height of the major peak to the left) at the right side (higher elution temperature) of the curve.

Applications

The resulting polymer is useful in a number of application including blown and cast film, and injection molding.

Prior Art Comparative Example

Comparative Example based on U.S. Pat. No. 4,923,833 issued May 8, 1990 to Kioka et al., assigned to Mitsui Petrochemical Industries, Ltd.

Catalyst Preparation:

In a 100 mL Schlenk flask, 0.799 g of 30% MAO was diluted with 1.57 g of toluene. 5 mL of decane was added over 30 min through a dropping funnel. After the addition, the dropping funnel was replaced with a septum. The Schlenk flask was then heated to 35° C. and a vacuum was applied to remove toluene in about 3 hours. After 3 hours, a thick goo remains. 5 mL of decane was added to reslurry MAO and the solution was filtered then reslurry in 10 mL of decane. 34 mg of the phosphinimine catalyst described below was diluted in 5 mL of toluene and added with stirring for 1 hour. The product was a light yellow powder with a yield of 165 mg.

Figure 3:
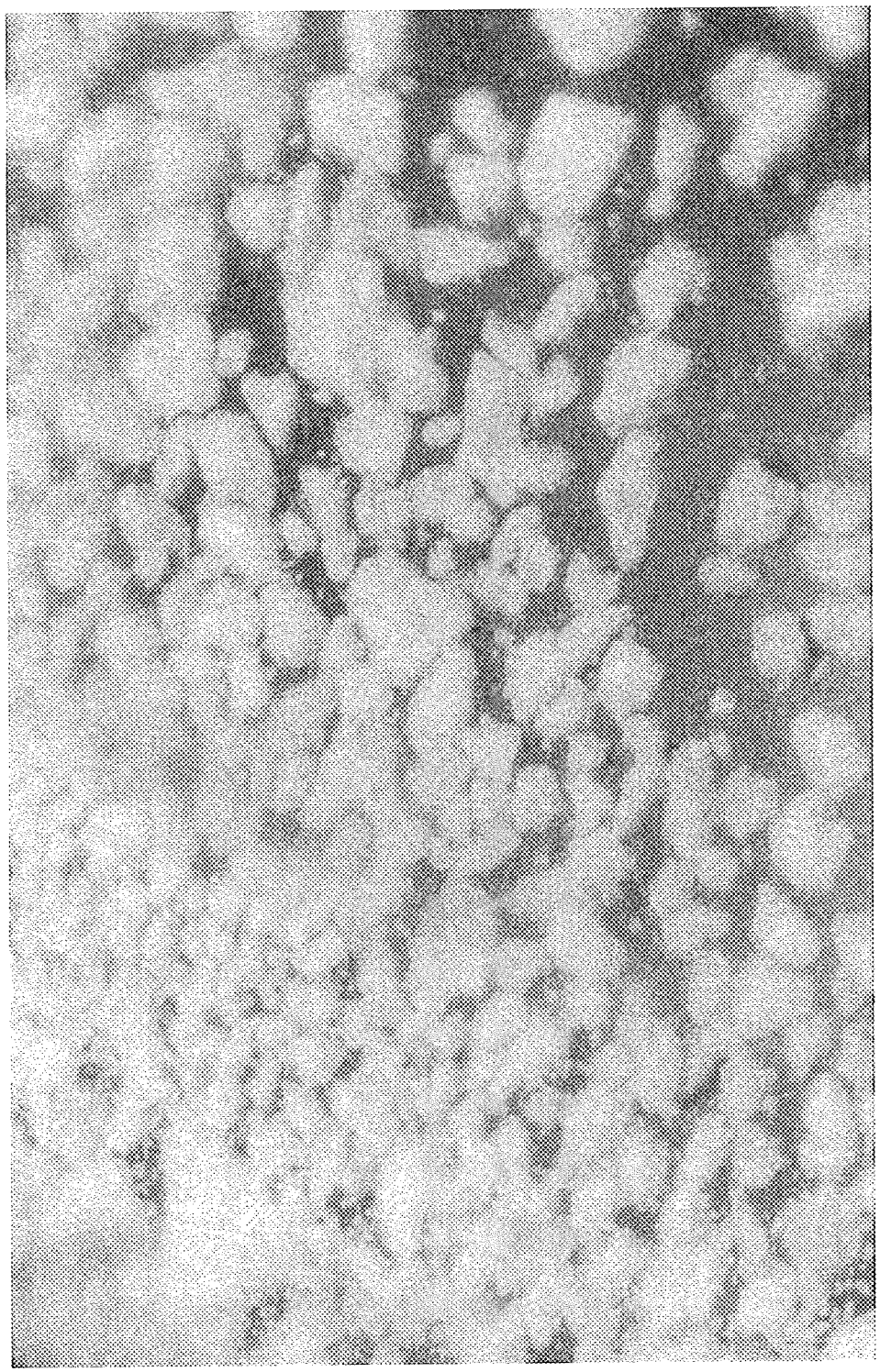
FIG. 3 is an electron microscopy picture (2× magnification) for polymer generated from prior art comparative example prepared in accordance with the Prior Art Comparative Example based on U.S. Pat. No. 4,923,833.
Figure 4:
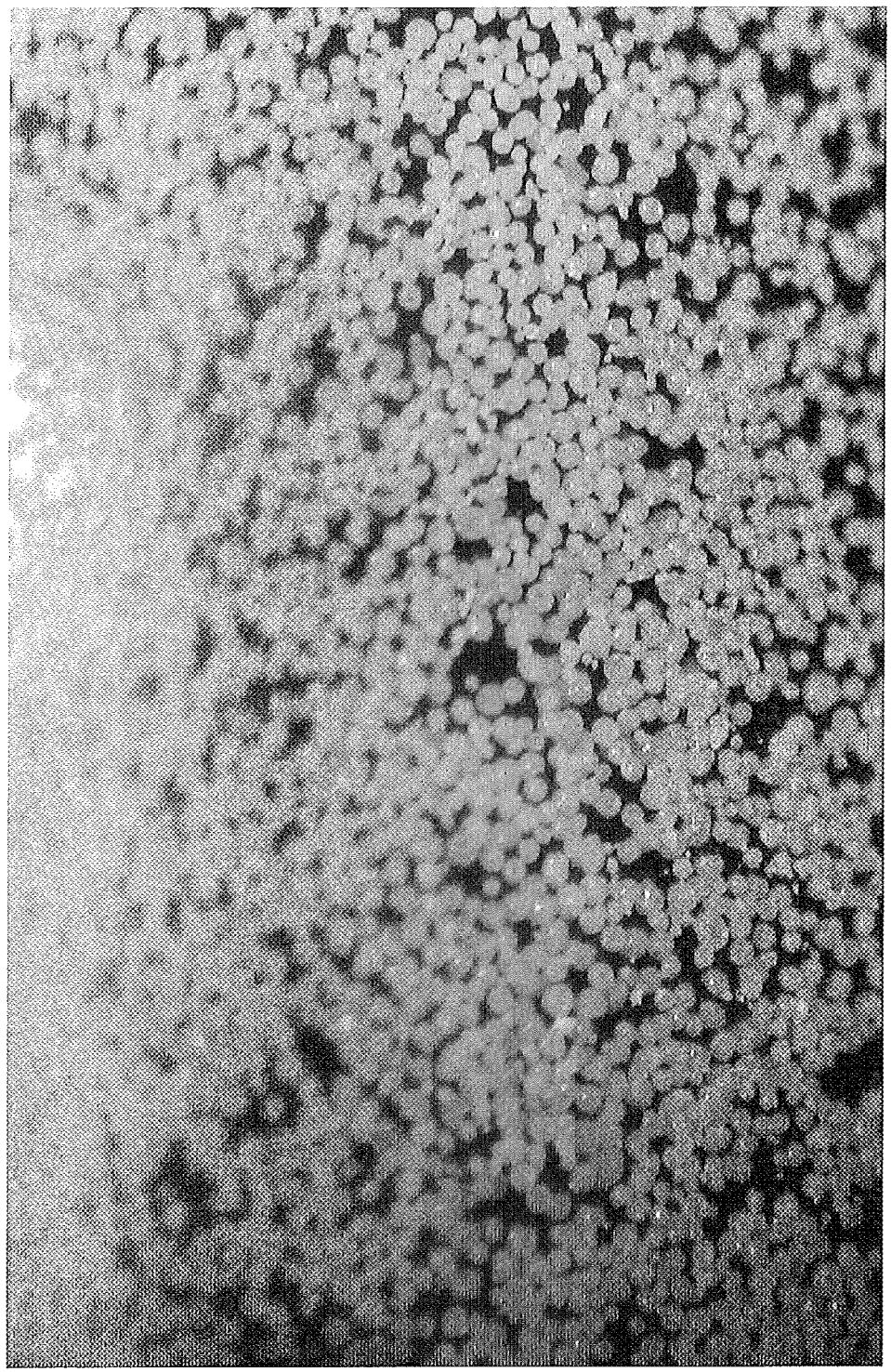
FIG. 4 is an electron microscope picture (4× magnification) of the catalyst prepared in accordance example 1.
Figure 5:
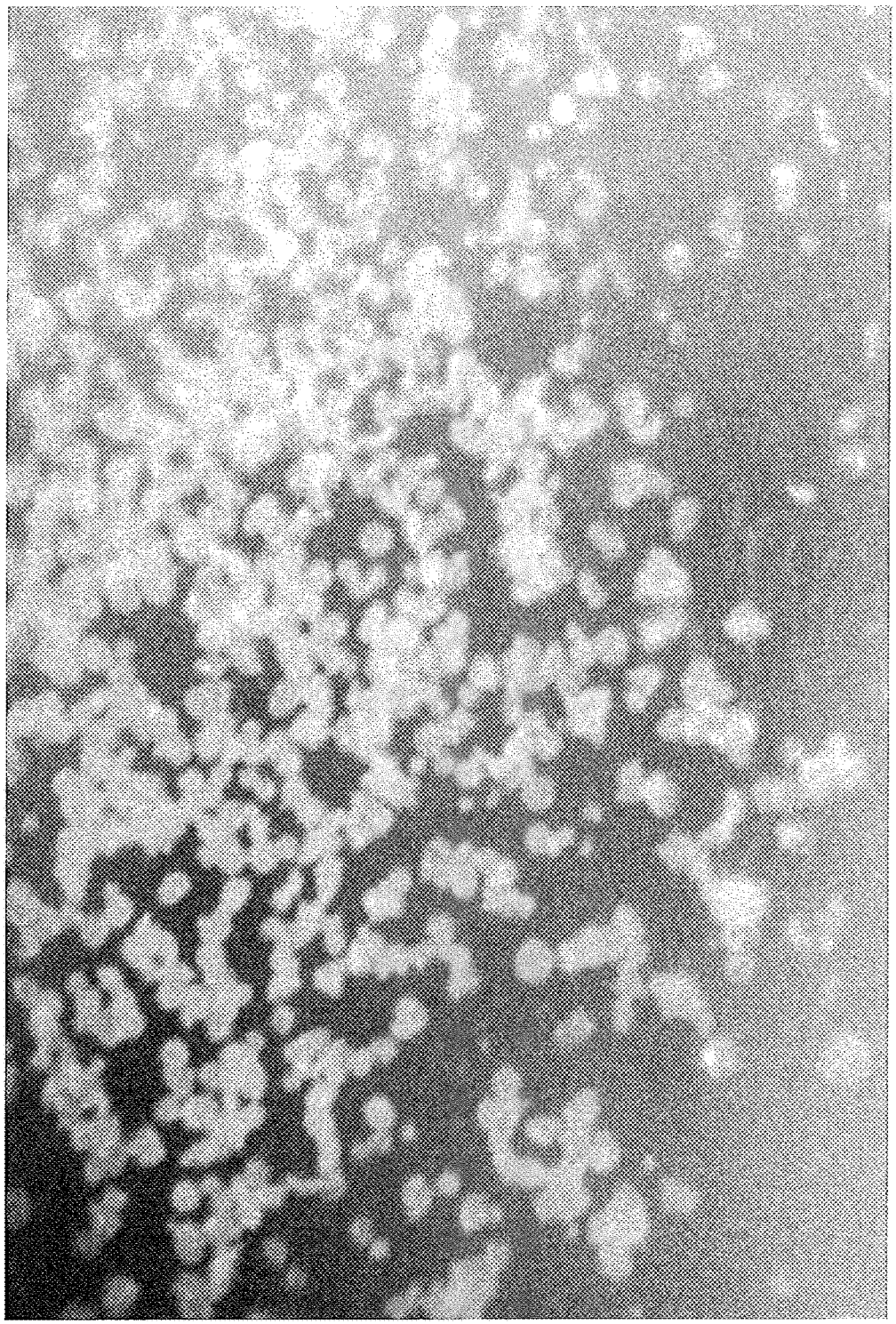
FIG. 5 is an electron microscope picture (2× magnification) of the pre polymerized catalyst prepared in accordance with example 2.

A photo of the catalyst in FIG. 3 shows the particles to be irregularly shaped, not spherical as those of the present invention.

The dry catalyst was run in a reactor (gas phase conditions). Productivity was 9262 g PE/g of catalyst per hour and bulk density was 18.2 lbs/ft$^3$. The bulk density is low and the polymer tends to be "fluffy" which is difficult to handle (e.g. remove from the reactor and transport) in commercial operation.

EXAMPLES

The present invention will now be illustrated by the following non limiting examples.

Reagents

In the experiments MAO was used as a 30% MAO solution (13.1 wt % Al) or as a 10% MAO solution 4.5 wt % Al) in toluene purchased from Albemarle.

The silica support for the comparative examples was Sylopol® 2408 purchased from Grace Davidson. The silica had a particle size from 12 to 76 μm and a pore volume of about 1.52 cc/gm.

The surfactant precursor was 2,2,3,3,4,4,5,5,6,6,7,7,8,8, 9,9,9-heptadecafluoronnyl oxirane purchased from Aldrich.

The diluent was perfluorooctane. It is 98% pure and was purchased from Aldrich.

The Catalyst

The catalyst was prepared in house by reacting 1-pentafluoro,3-timethyl silyl cyclopentadiene in tetrahydrofuran (THF) at 0° C. with butyl lithium and 1-bromo isopropane which was allowed to rise to room temperature to yield 1-propane, 2-pentfluorophenyl cyclopentadiene which was separated from the THF and subsequently reacted in toluene with titanium tetrachloride at 90° C. to yield 1-propyl, 2-pentafluorophenyl, cyclopentadienyl titanium tri chloride. The tri chloride was subsequently reacted trimethylsilyl-triisobutylphoshinimine to yield the catalyst.

Comparative Example

Sylopol 2408 (silica support) was contacted with the 30% solution of MAO to yield a MAO treated support. The support was subsequently contacted with the catalyst in a toluene solution. The ratio of MAO to Ti was 120:1. The supported catalyst and activator were recovered and dried. The dried catalyst was fed to a bench scale reactor having a volume of 2 L, scavenged with tri-isobutyl aluminum (0.25 ml of a 25% solution in toluene) fed with ethylene and hexane feed in a 60:1 molar ratio. The reaction continued at 90° C. for an hour and the polymer was recovered. The productivity of the catalyst was 2500 g of polyethylene per gram of catalyst per hour. A CTREF of the polymer was taken. This is FIG. 1. Note in figure the high shoulder on the right of the CTREF. A GPC-FTIR was also taken of the sample. The polymer had a CDBI of 45.4 and a relatively flat comonomer incorporation. The weight average molecular weight (Mw) of the polymer was 120,000 and the polydispersity (Mw/Mn) was 2.6. The bulk density of the resulting polyethylene was 23.7 lb/ft³.

Example 1 Inventive Catalyst/Polymer

To a solution of catalyst, without support in toluene at a temperature of about room temperature was added a 30% solution of MAO in toluene to provide a molar ratio of Al:Ti of 45:1. To the solution was added the surfactant precursor and an additional amount of MAO until bubbling stopped (the precursor is believed to have been converted from the oxirane to $R_f$—OAlR$_2$). The resulting solution was slowly added to a solution of perfluorooctane which was warmed to about 90° C. with mechanical stirring (about 500 rpm) forming an emulsion. The emulsion was discharged into a receiving vessel containing additional perfluorooctane in the receiving vessel at a temperature of 90° C. The perfluorooctane and toluene of the emulsion became miscible in the perfluorooctane and the catalyst and MAO precipitated from the perfluorooctant as fine uniform particles (spheres). The perfluorooctane was decanted from the precipitate and the precipitate was dried under nitrogen. The catalyst particles had a size around 50 µm.

Figure 2:
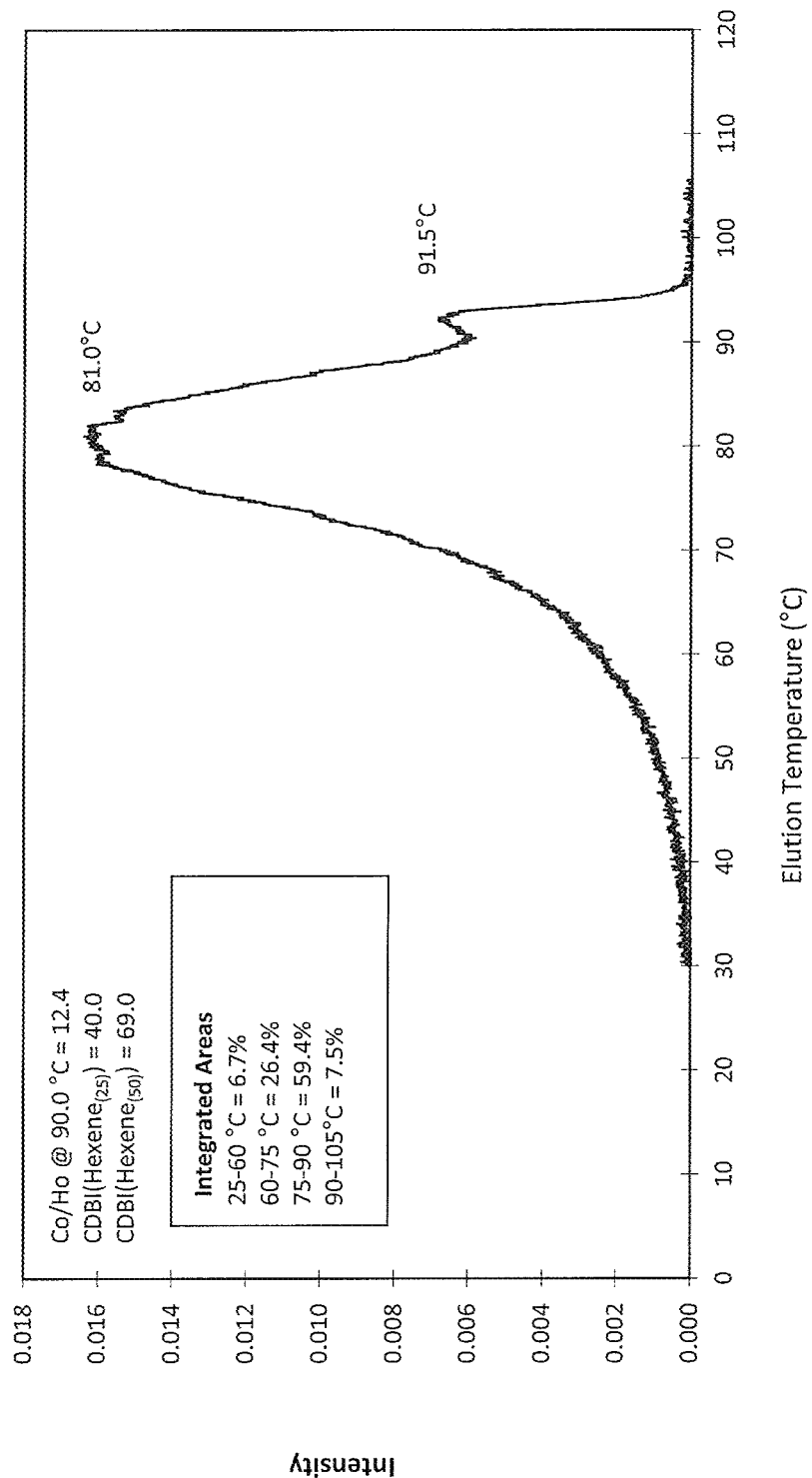
FIG. 2 is a CTREF profile of a polymer prepared in the same bench scale reactor using the same catalyst prepared in accordance with the present invention.

The catalyst was polymerized as in the comparative example except the Al:Ti ratio was 90:1. The productivity of the catalyst was 3000 g of PE per g of catalyst per hour. The CTREF of the resulting polymer is shown in FIG. 2. The high peak on the right hand side of the CTREF has been significantly reduced. The resulting polymer had a CDBI of 69. The comonomer incorporation as determined by GPC-FTIR was slightly reversed. The polymer had a molecular weight of 137,300 and a polydispersity (Mw/Mn) of 2.7 and a bulk density of 21.8 lb/ft³.

Example 2 Prepolymerized Catalyst

A catalyst prepared as above except the ratio of MAO to catalyst was 67.5:1. The resulting catalyst was prepolymerized with a mixture of ethylene and hexene in a prepolymerizer to a growth factor of 5 (e.g. the mass of the catalyst increased by 5 times. The polymer particles were large spherical particles. The catalyst was then polymerized in the same manner as the other examples. The productivity of the catalyst was 1550 g of polyethylene per gram of catalyst per hour. The bulk density of the resulting polymer was 25.5 lb/ft³.

Example 3

Example 1 was repeated except that the ratio of Al/Ti was reduced to 67.5 (mol/mole) per example 2. The amount of perfluorooxirane was reduced to 85% of that previously used. Additionally the perfluorooxirane was scavenged with TEAL at a TEAL to catalyst ratio of 3.14 mole per mole. The resulting catalyst was spherical. The productivity of the catalyst was 130,681 g of PE per mmol Ti per hour.

INDUSTRIAL APPLICABILITY

The present invention provides a polyolefin polymer having a bimodal composition with a reduced higher molecular weight component prepared using a self-supported phosphinimine single site catalyst.

The invention claimed is:
1. A process for gas phase or slurry polymerization comprising the steps of:
forming a solution of a hydrocarbyl solvent, a self-supported catalyst of the formula

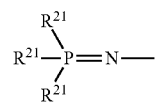

wherein M is chosen from Ti, Zr and Hf; PI is a phosphinimine ligand of the formula:

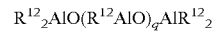

wherein each $R^{21}$ is independently chosen from a hydrogen atom; a halogen atom; $C_{1-10}$ hydrocarbyl radicals
L is a monoanionic ligand chosen from a cyclopentadienyl-type ligand which is substituted by up to three $C_{1-6}$ linear, branched, cyclic or aromatic hydrocarbons which are unsubstituted or up to fully substituted by fluorine atoms;
Y is independently chosen from activatable ligands; m is 1 or 2;
n is 0 or 1; p is an integer and the sum of m+n+p equals the valence state of M, and an activator of the formula:

$R^{12}{}_2AlO(R^{12}AlO)_qAlR^{12}{}_2$ wherein each $R^{12}$ is independently chosen from °C.$_{1-20}$ hydrocarbyl radicals and q is from 3 to 50 to provide a molar ratio of Al from the activator to M from the catalyst from 10:1 to 500:1;
in the presence of a surfactant chosen from $C_{3-10}$ fluorocarbyl epoxides or alcohols,
which hydrocarbyl solution is dispersed in a $C_{6-12}$ perfluoroalkane diluent forming a dispersion,
wherein the volume ratio of hydrocarbyl solvent to perfluoroalkane diluent is 0.2, without additional surfactant
with stirring at a temperature from −15° C. to 15° C. to form a stable dispersion and adding a part or all of said stable dispersion to additional $C_{6-12}$ perfluoroalkane at a temperature greater than 70° C. to precipitate the catalyst as particles having a diameter from 5 to 200 µm;

using said catalyst particles to conduct said gas phase or slurry polymerization;

and further wherein the process results in a copolymer comprising from 80 to 99 weight % of ethylene and from 20 to 1 weight % of one or $C_{4-8}$ alpha olefins, said copolymer having a density from 0.910 to 0.945 g/cc; a CDBI greater than 65% as measured using TREF; a polydispersity from 2.5 to 3.5, and a bimodal TREF curve.

2. The process according to claim 1, wherein the catalyst particles are recovered by one or more of decanting the perfluoroalkane diluent and hydrocarbyl solvent, and removing the perfluoroalkane diluent and hydrocarbyl solvent under a stream of inert gas.

3. The process according to claim 1, wherein in the surfactant is formed by reacting a surfactant precursor chosen from one or more $C_{4-10}$ perfluorocarbons having a terminal hydroxyl group or a terminal oxirane group with said activator at a molar ratio of activator to fluorocarbon from 4 to 150.

4. The process according to claim 3, wherein the surfactant precursor is chosen from perfluorohexanol, perfluoroheptanol, perfluorooctanol and perfluorononanol.

5. The process according to claim 1, wherein the $C_{6-12}$ perfluoroalkane is perfluorooctane.

6. The process according to claim 1, wherein in the catalyst the leaving group is chosen from chlorine atoms and $C_{1-4}$ alkyl radicals.

7. The process according to claim 1, wherein in the phosphinimine ligand $R^{21}$ is chosen from $C_{3-6}$ straight chained or branched alkyl radicals.

8. The process according to claim 6, wherein in the catalyst L is chosen from a cyclopentadienyl radical which is substituted at the one position with a pentafluorophenyl radical and at the 2 position with a n-propyl radical.

9. The process according to claim 1, wherein in the catalyst the molar ratio of Al:M is from 50:1 to 150:1.

10. The process according to claim 1, wherein the solvent and diluents are removed from the catalyst at a temperature not less than 90° C.

11. The process according to claim 1 wherein in the catalyst M is Ti.

12. The process according to claim 1, wherein the polymer has a density for 0.910 to 0.920 comprising from 85 to 95 weight % of ethylene and from 15 to 5 weight % of a monomer chosen from 1-butene and 1-hexene.

13. The process according to claim 1, wherein the polymerization is a gas phase polymerization.

14. The process according to claim 1, wherein the polymerization is a slurry phase polymerization.

15. The process according to claim 1, wherein said catalyst is prepolymerized with one or more $C_{2-6}$ alpha olefins to provide a weight growth increase from 1 to 25.

16. The process according to claim 15, wherein the polymer has an increased bulk density from 10-25 weight % over a polymer prepared using the same process in the presence of the same catalyst which is supported on an inorganic oxide.

17. The process according to claim 15, wherein the catalyst particles are recovered by one or more of decanting the perfluoroalkane diluent and hydrocarbyl solvent and removing the perfluoroalkane diluent and hydrocarbyl solvent under a stream of inert gas.

18. The process according to claim 15, wherein the surfactant is formed by reacting a surfactant precursor chosen from one or more $C_{4-10}$ perfluorocarbons having a terminal hydroxyl group or a terminal oxirane group with said activator at a molar ratio of activator to fluorocarbon from 4 to 150.

19. The process according to claim 18, wherein the surfactant precursor is chosen from perfluorohexanol, perfluoroheptanol, perfluorooctanol and perfluorononanol.

20. The process according to claim 15, wherein the $C_{6-12}$ perfluoroalkane is perfluorooctane.

21. The process according to claim 15, wherein in the catalyst the leaving group is chosen from chlorine atoms and $C_{1-4}$ alkyl radicals.

22. The process according to claim 15, wherein in the phosphinimine ligand $R^{21}$ is chosen from $C_{3-6}$ straight chained or branched alkyl radicals.

23. The process according to claim 15, wherein in the catalyst L is chosen from a cyclopentadienyl radical which is substituted at the one position with a pentafluorophenyl radical and at the 2 position with a n-propyl radical.

24. The process according to claim 15, wherein in the catalyst the molar ratio of A:M is from 50:1 to 150:1.

25. The process according to claim 15, wherein in the catalyst M is Ti.

26. The process according to claim 15, wherein the hydrocarbyl solvent and diluents are removed from the catalyst at a temperature not less than 90° C.

27. The process according to claim 15, having a density for 0.910 to 0.920 comprising from 85 to 95 weight % of ethylene and from 15 to 5 weight % of a monomer chosen from 1-butene and 1-hexene.

28. The process according to claim 15, wherein the polymerization is a gas phase polymerization.

29. The process according to claim 15, wherein the polymerization is a slurry phase polymerization.

* * * * *